US010428711B2

(12) United States Patent
Zhang

(10) Patent No.: US 10,428,711 B2
(45) Date of Patent: Oct. 1, 2019

(54) MIXER FOR MIXING EXHAUST GAS

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 15/499,327

(22) Filed: Apr. 27, 2017

(65) Prior Publication Data

US 2018/0313246 A1    Nov. 1, 2018

(51) Int. Cl.
| | |
|---|---|
| *F01N 3/28* | (2006.01) |
| *B01F 5/04* | (2006.01) |
| *B01F 5/06* | (2006.01) |
| *B01F 3/04* | (2006.01) |
| *F01N 3/20* | (2006.01) |

(52) U.S. Cl.
CPC ........ *F01N 3/2892* (2013.01); *B01F 3/04049* (2013.01); *B01F 5/0473* (2013.01); *B01F 5/0614* (2013.01); *B01F 5/0659* (2013.01); *F01N 3/2066* (2013.01); *F01N 2240/20* (2013.01); *F01N 2470/24* (2013.01); *F01N 2610/02* (2013.01)

(58) Field of Classification Search
CPC ............... F01N 2240/20; F01N 3/2066; F01N 2610/02; F01N 2610/1453; F01N 3/2895; F01N 13/008; F01N 13/20; F01N 2610/06; F01N 3/02; F01N 3/208; F01N 3/24; F01N 3/28; Y02T 10/24; Y02T 10/47; B01F 5/061; B01F 2005/0017; B01F 2005/0441; B01F 2005/063; B01F 5/0415; B01F 5/0473; B01F 5/0602; B01F 5/0616; B01F 5/0618; B01D 2251/2067; B01D 53/8631; B01D 53/9431; F02M 26/10; F02M 26/19; F02M 35/10118; F02M 35/10157; F02M 35/10222; F23D 14/64; F23J 15/003; F23R 3/14; F23R 3/286; G01M 15/102; G01N 1/2252; G01N 33/0037; Y02A 50/245; Y02C 20/10; Y10T 137/87587; Y10T 137/87652

See application file for complete search history.

(56) References Cited

U.S. PATENT DOCUMENTS

| | | | | |
|---|---|---|---|---|
| 1,484,526 | A | * | 2/1924 | O'Connor ................. F01N 1/08 181/239 |
| 2,185,489 | A | * | 1/1940 | Wilman ..................... F01N 1/12 181/247 |

(Continued)

OTHER PUBLICATIONS

Zhang, Xiaogang et al., "Urea Mixer," U.S. Appl. No. 15/042,680, filed Feb. 12, 2016, 35 pages.

(Continued)

Primary Examiner — Audrey K Bradley
Assistant Examiner — Anthony Ayala Degado
(74) Attorney, Agent, or Firm — Geoffrey Brumbaugh; McCoy Russell LLP

(57) ABSTRACT

Methods and systems are provided for an exhaust gas mixer. In one example, a system may comprise an outer annular portion exterior to an exhaust pipe and an inner annular portion interior to the exhaust pipe, where the outer annular portion comprises a spiral fin extending around the exhaust pipe in a downstream direction.

17 Claims, 8 Drawing Sheets

(56) References Cited

U.S. PATENT DOCUMENTS

| | | | | |
|---|---|---|---|---|
| 2,293,632 | A | * | 8/1942 | Sauer .................. F01N 3/05 |
| | | | | 181/259 |
| 5,058,704 | A | * | 10/1991 | Yu ...................... F01N 1/089 |
| | | | | 181/262 |
| 5,152,366 | A | * | 10/1992 | Reitz .................. F01N 1/00 |
| | | | | 181/249 |
| 6,889,500 | B1 | * | 5/2005 | Martinez ............ F01N 1/12 |
| | | | | 60/312 |
| 7,032,578 | B2 | | 4/2006 | Liu et al. |
| 7,537,083 | B2 | * | 5/2009 | Frederiksen ....... F01N 1/04 |
| | | | | 181/212 |
| 2005/0205355 | A1 | * | 9/2005 | Lin ..................... F01N 1/088 |
| | | | | 181/279 |
| 2007/0036694 | A1 | | 2/2007 | Nishioka et al. |
| 2017/0120193 | A1 | | 5/2017 | Zhang |
| 2017/0136410 | A1 | | 5/2017 | Zhang |

OTHER PUBLICATIONS

Zhang, Xiaogang, "Mixer for Mixing Exhaust Gas," U.S. Appl. No. 15/058,743, filed Mar. 2, 2016, 48 pages.
Zhang, Xiaogang, "SCR Device," U.S. Appl. No. 15/091,001, filed Apr. 5, 2016, 40 pages.
Zhang, Xiaogang, "Emission Control System and Reductant Injector," U.S. Appl. No. 15/092,270, filed Apr. 6, 2016, 30 pages.
Zhang, Xiaogang, "Urea Mixer," U.S. Appl. No. 15/214,974, filed Jul. 20, 2016, 37 pages.

\* cited by examiner

MIXER FOR MIXING EXHAUST GAS

FIELD

The present description relates generally to methods and systems for an exhaust gas mixer

BACKGROUND/SUMMARY

In an effort to meet stringent federal government emissions standards, engine systems may be configured with a plurality of technologies for decreasing emissions. Specifically, it may be desired to address nitrogen oxide ($NO_x$) emissions. Two example technologies for decreasing $NO_x$ may include exhaust gas recirculation (EGR) and a selective catalytic reduction (SCR) device. Reducing $NO_x$ via EGR includes recirculating a controllable proportion of the engine's exhaust back into an intake passage to combine with intake air. The addition of EGR may not chemically participate in combustion (e.g., the gas is substantially inert) and may reduce an amount of cylinder contents available for combustion. This may lead to a correspondingly lower peak cylinder temperature and heat release. By doing this, $NO_x$ emissions may be decreased. Decreasing $NO_x$ via the SCR device includes a reductive reaction between $NO_x$ and ammonia ($NH_3$) facilitated by the SCR device, which converts NOx into nitrogen ($N_2$) and water ($H_2O$). $NH_3$ is introduced into an engine exhaust system upstream of an SCR catalyst by injecting urea into an exhaust pathway, or is generated in an upstream catalyst. The urea entropically decomposes to $NH_3$ under high temperature conditions.

However, as recognized by the inventors herein, issues may arise upon flowing EGR into the intake passage and/or upon injecting urea into the exhaust pathway. In one example, EGR is introduced into the intake passage before the intake passage divides upstream of a multi-cylinder engine. Desired EGR mixing with intake air may be difficult to achieve at various engine speeds/loads, which may lead to uneven distribution of the EGR/intake air mixture. For example, one cylinder may receive too much EGR, possibly resulting in increased particulate emissions, and another cylinder may receive too little EGR, possibly resulting in increased $NO_x$ emissions. As a second example, urea may poorly mix with exhaust gas (e.g., a first region of exhaust gas has a higher concentration of urea than a second region of exhaust gas of an exhaust passage) which may lead to poor coating of the SCR and poor reactivity between emissions (e.g., $NO_x$) and the SCR. Additionally, overly mixing and agitating the urea in the exhaust can likewise cause issues, such as increased deposits. Thus, both introduction of EGR into the intake passage and introduction of urea in the exhaust passage may succumb to poor mixing.

Attempts to address insufficient mixing include introducing a mixing device at a junction between an EGR outlet and an intake passage and/or to introduce a mixing device downstream of a urea injector and upstream of an SCR device such that dispersion of EGR or urea may be more homogenous. Further attempts include one or more of adjusting valve function to introduce a backpressure to an intake and/or exhaust passage and/or to include injectors with swirlers and/or other turbulence generating features.

However, the inventors herein have recognized potential issues with such systems. As one example, a mixing potential of the devices may be limited. As an example, static mixers may be limited due to a velocity of gas flow due to their lack of vacuum or other mixing assisting features. Thus, the size of the mixers may be increased to overcome a dependence on gas velocity. However, increasing the size of the mixers may result in increasing a size of a gas passage, ultimately demanding significant modifications to a design of the gas passage. This may increase a production cost of a vehicle.

In one example, the issues described above may be addressed by a mixer comprising an outer annular portion exterior to an exhaust pipe and an inner annular portion interior to the exhaust pipe, where the outer annular portion comprises a spiral fin extending around the exhaust pipe in a downstream direction. In this way, exhaust gas may interact with inner and outer portions of the mixer to increase exhaust gas homogeneity.

As one example, the outer annular portion may comprise an outer passage located between the exhaust pipe and an outer surface. The spiral fin may adjust exhaust gas flow through the outer passage before directing exhaust gas flow to the inner annular portion in the exhaust passage. The inner annular portion may constrict the exhaust passage, wherein a vacuum is generated along annular perforations of the inner annular portion. This vacuum may promote exhaust gas flow into the outer and inner annular portions. By doing this, exhaust gas mixing may increase as exhaust gas flows through the various portions of the mixer. This may also occur in conjunction with a reductant injection. As such, reductant mixing into the exhaust gas upstream of an exhaust device may increase.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-8 are shown approximately to scale.

DETAILED DESCRIPTION

Figure 1:
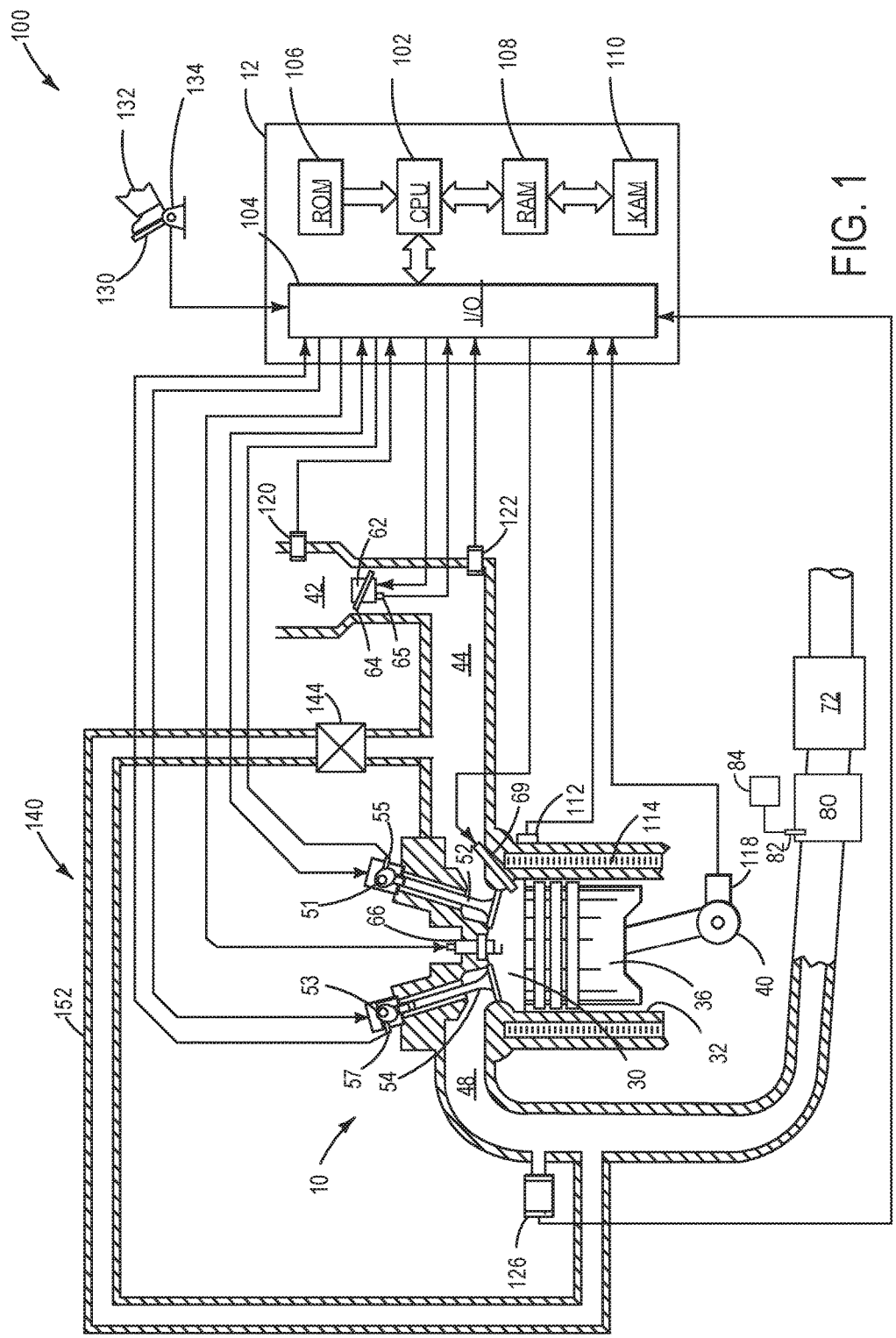
FIG. 1 shows an engine having a single cylinder with a mixer arranged in an exhaust passage coupled to the cylinder.
Figure 2:
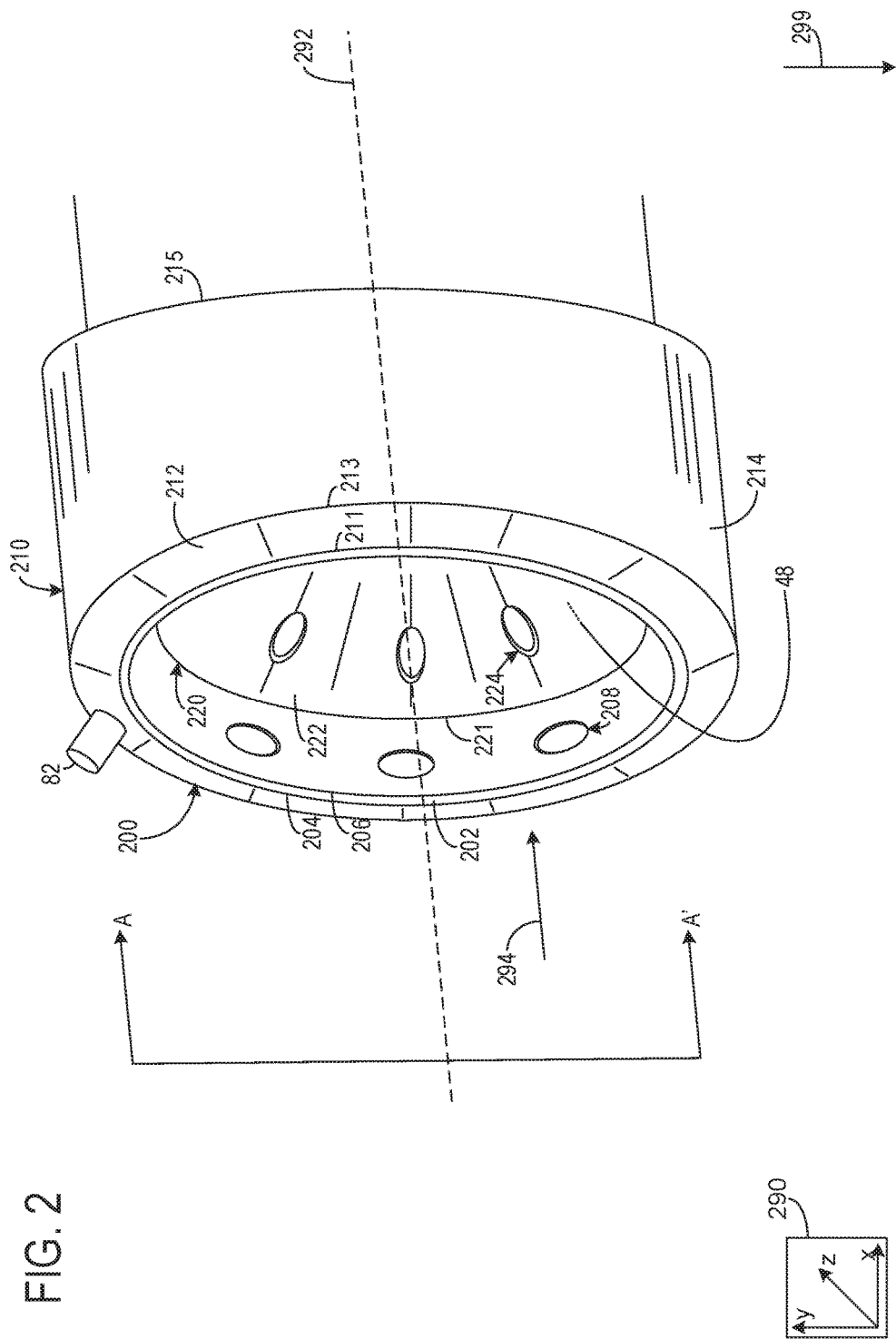
FIG. 2 shows a first embodiment of the mixer.
Figure 3:
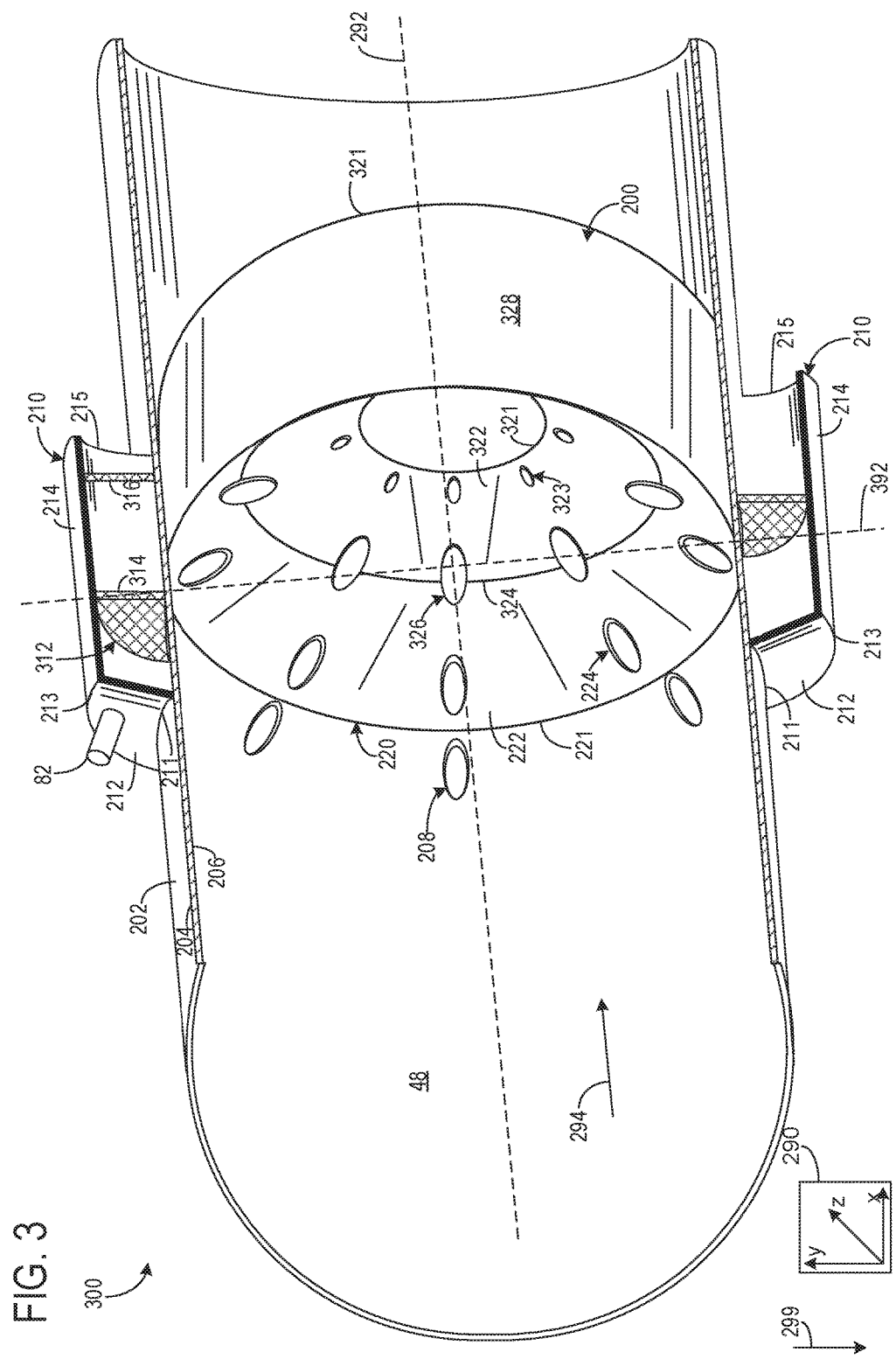
FIG. 3 shows a perspective view of the first embodiment.

The following description relates to systems and methods for a mixer arranged in an exhaust gas passage, as shown in FIG. 1. In a first embodiment, the mixer comprises an outer annular portion located around an outer circumference of the exhaust pipe and an inner annular portion located around an inner circumference of the exhaust pipe. As shown in FIG. 2, both the outer and inner annular portions are configured to receive exhaust gas from the exhaust gas passage. A cross-section of the mixer and exhaust pipe reveals a spiral fin arranged between the exhaust pipe and the outer annular portion, as shown in FIG. 3. The outer annular portion further comprises a reductant injector positioned to inject into a space located between each of the outer annular surface, exhaust pipe, and fin. The outer annular portion is omitted in FIG. 4 to better illustrate a structure of the spiral fin. The outer and inner annular portions may work synergistically to not only increase a flow path of exhaust gas, but to also impart a swirl and/or turbulence onto the exhaust gas such that a greater amount of exhaust gas mixing may occur. An example of exhaust gas mixing through the first embodiment of the mixer is shown in FIG. 5.

Figure 6:
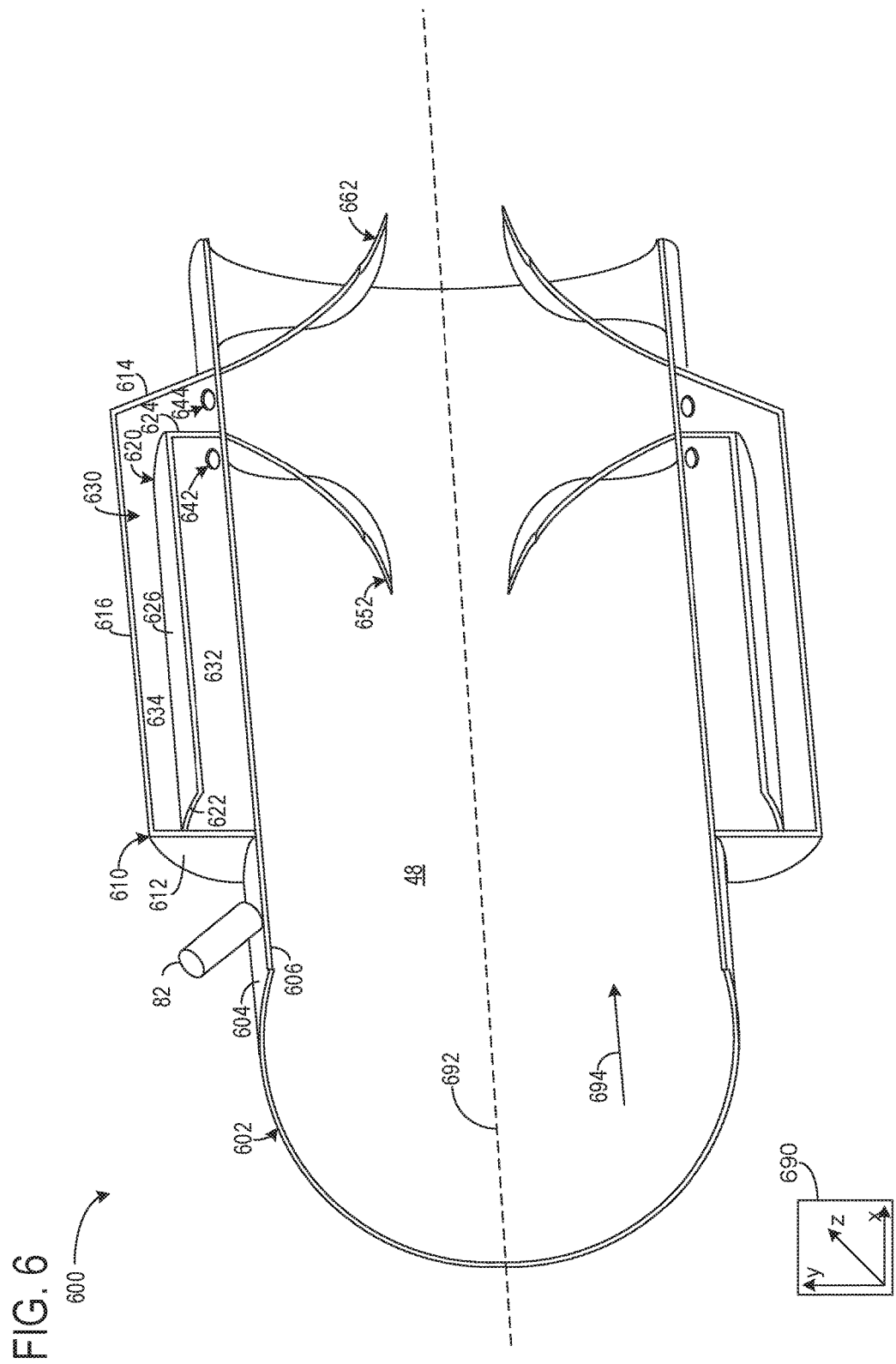
FIG. 6 shows a second embodiment of the mixer.

In a second embodiment, the mixer comprises an outer annular portion having a U-shaped flow path. The flow path directs exhaust gas in a first direction before redirecting the exhaust gas in a second direction opposite the first direction. The outer annular portion receives exhaust gas from the exhaust passage at a location directly upstream of one or more twisted blades. The outer annular portion expels the exhaust gas to the exhaust passage at a location between one or more twisted blades, as shown in FIG. 6. The twisted blades are shown in greater detail in FIGS. 7A and 7B, wherein the twisted blades include upstream blades and downstream blades. In one example, the upstream blades are oriented and/or twisted in a direction opposite to the orientation and/or twisting of the downstream blades. The mixer is configured to increase an exhaust gas mixing by increasing an exhaust gas flow path and imparting a swirl and/or turbulence onto the exhaust gas. An example exhaust gas flow through the mixer is shown in FIG. 8.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 72 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 72 is shown arranged along the exhaust passage 48 downstream of both the exhaust gas sensor 126. The device 72 may be a three way catalyst (TWC), $NO_x$ trap, selective catalytic reductant (SCR), various other emission control devices, or combinations thereof. In some examples, during operation of the engine 10, the emission control device 72 may be periodically reset by operating at least one cylinder of the engine within a particular air-fuel ratio.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

A mixer 80 is arranged in the exhaust passage 48 downstream of the EGR system 140 and upstream of the aftertreatment device 72. The mixer 80 may be fluidly coupled to an injector 82, which is coupled to a reductant reservoir 84. The reductant in the reservoir 84 may be one or more of urea, fuel, and the like. The mixer 80 may comprise inner and outer portion relative to the exhaust passage 48 such that the mixer 80 is configured to direct a portion of exhaust gas out of the exhaust passage. The exhaust gas may flow around in the mixer outside of the exhaust passage before flowing back into the exhaust passage 48. In this way, the mixer is receives exhaust gas from and directs exhaust gas to only the exhaust passage 48, in one example.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller.

Turning now to FIG. 2, it shows a perspective view of a first embodiment of a mixer 200 arranged along exhaust passage 48. In one example, the mixer 200 is used similarly to the mixer 80 of FIG. 1. As such, components previously introduced may be similarly numbered in subsequent figures. The mixer 200 is shown coupled to interior and exterior portions of an exhaust pipe 202, which may house the exhaust passage 48. The mixer 200 and exhaust pipe 202 comprise various contours and/or cut-outs which may operate synergistically to increase exhaust gas mixing, as will be described herein.

An axis system 290 includes three axes, namely an x-axis parallel to a horizontal direction, a y-axis parallel to a vertical direction, and a z-axis perpendicular to both the x- and y-axes. A direction of gravity is shown by arrow 299. As such, arrow 299 is herein referred to as gravity 299. Dashed line 292 indicates a central axis of one or more of the exhaust pipe 202 and exhaust passage 48. Herein, the dashed line 292 is referred to as central axis 292. In one example, the central axis 292 is parallel to the x-axis. Arrow 294 indicates a general direction of exhaust gas flow through the exhaust passage 48. In one example, the direction of exhaust gas flow 294 is parallel to the central axis 292. A length of the mixer 200 may describe a distance of the mixer 200 along the x-axis. A height of the mixer 200 may describe a distance of the mixer 200 along the y-axis. Lastly, a thickness of the mixer 200 may describe a distance of the mixer 200 along the z-axis.

The mixer 200 may comprise of one or more of aluminum, carbon fiber, magnesium, iron, steel, plastic, and a combination thereof. The mixer 200 may be physically coupled to the exhaust pipe 202 via one or more of welds, fusions, adhesives, and screws. In this way, the mixer 200 is immovable. Additionally, the mixer 200 may not be hydraulically, electrically, and mechanically powered. Thus, the mixer 200 may be a static mixer and may not slide, rotate, oscillate, or perform any other type of movement during vehicle operations. In one example, the mixer 200 is fixed and immovable.

An outer annular portion 210 is physically coupled to an outer circumference 204 and/or outer surface 204 of the exhaust pipe 202. The outer annular portion 210 is exterior to the exhaust passage 48 located within the exhaust pipe 202. As such, exhaust pipe 202 separates the outer annular portion 210 from the exhaust passage.

Reductant injector 82 is physically coupled to an upstream surface 212 of the outer annular portion 210. The injector 82 is positioned to inject into a space located between the outer surface 204 of the exhaust pipe 202 and the outer annular portion 210.

The upstream outer surface 212 may be angled relative to the exhaust pipe 202. The angle is less than 90°. In one example, the angle is exactly 60°. As such, the upstream outer surface 212 is angled in the downstream direction. The upstream outer surface 212 is flush with the outer surface 204 of the exhaust pipe 202 at an outer upstream location 211. A distance between the upstream outer surface 212 and the outer surface 204 of the exhaust pipe 202 increases in a downstream direction from the outer upstream location 211 and reaches a maximum value at an outer downstream location 213. In one example, a length of the upstream outer surface is substantially equal to a distance between the outer upstream 211 and outer downstream 213 locations.

Herein, upstream and downstream may be used to describe a positioning of components. In one example, upstream and downstream are described relative to a direction of exhaust gas flow. Additionally or alternatively, upstream and downstream may be used to describe a distance of a component from an engine, wherein upstream components are nearer to the engine than downstream components. For example, the outer upstream location 211 is upstream of the outer downstream location 213. Said another way, the outer downstream location 213 is downstream of the outer upstream location 211.

The mixer 200 further comprises an outer annular wall 214 which is physically coupled to the upstream outer surface 212 at the outer upstream location 211 and is physically coupled to the exhaust pipe 202 at an extreme end 215 of the outer annular portion 210. The outer annular wall 214 is concentric with the exhaust pipe 202 about the central axis 292. A difference between a diameter of the outer annular wall 214 and a diameter of the exhaust pipe 202 is substantially equal to a thickness of the outer annular portion 210. Said another way, a diameter of the outer annular wall 214 is greater than a diameter of the exhaust pipe 202 by a thickness of the outer annular portion 210.

An inner annular portion 220 is physically coupled to an inner circumference 206 and/or inner surface 206 of the exhaust pipe 202. In one example, a difference between the outer circumference 204 and the inner circumference 206 is substantially equal to a thickness of the exhaust pipe 202. In this way, the inner annular portion 220 comes into direct contact with exhaust gas flowing through the exhaust passage 48.

An inner upstream surface 222 is flush with the inner surface 206 at an inner upstream location 221. The inner upstream surface 222 is spaced away from the inner surface 206 downstream of the inner upstream location 221. In this way, the inner upstream surface 222 restricts a flow of exhaust gas through the exhaust passage 48 by decreasing a diameter of a flow-through area corresponding to a location of the inner upstream surface 222. Said another way, the inner upstream surface 222 extends farther away from the inner surface 206 of the exhaust pipe 202 in a downstream direction, beginning at the inner upstream location 221. This results in a reduced cross-sectional flow-through area of the exhaust passage 48. In this way, the cross-sectional flow-through area of the exhaust passage 48 decreases downstream of the inner upstream location 221, resulting in a more constricted exhaust passage 48.

A cross-section of the outer annular portion 210 along the y-axis may be circular along any portion of the outer annular portion 210 in the x-direction. Likewise, a cross-section of the inner annular portion 220 along the y-axis may be circular along any portion of the inner annular portion 220 in the x-direction. Additionally, cross-sections taken along the y-axis of the outer annular portion 210 and the inner annular portion 220 may overlap in the x-direction, as shown in FIG. 5.

Both the outer annular portion 210 and the inner annular portion 220 are hollow. Thus, there are spaces located in both of the outer 210 and inner 220 annular portions for flowing gas therethrough. The outer annular portion 210 may receive exhaust gas from the exhaust passage 48 via upstream exhaust pipe perforations 208. The upstream exhaust pipe perforations 208 are located in a portion of the exhaust pipe 202 upstream of the inner upstream location 221 and downstream of the outer downstream location 213. The upstream exhaust pipe perforations 208 may be flush with the inner surface 206 of the exhaust pipe 202 and extend through an entire thickness of the exhaust pipe 202. As such, the upstream exhaust pipe perforations 208 may be perpendicular to the direction of exhaust gas flow 294. In this way, the upstream exhaust pipe perforations 208 fluidly couple the outer annular portion 210 to the exhaust passage 48. Each of the upstream exhaust pipe perforations 208 may be spaced apart from one another and located along an entire circumference of the inner surface 206. Each of the upstream exhaust pipe perforations 208 are substantially identical to one another in size and shape. In one example, each of the upstream exhaust pipe perforations 208 are elliptical. However, the upstream exhaust pipe perforations 208 may be other shapes and sizes without departing from the scope of the present disclosure. For example, some of the upstream exhaust pipe perforations 208 may be square, rectangular, triangular, pentagonal, hexagonal, etc.

The inner annular portion 220 may receive exhaust gas from the exhaust passage 48 via inner upstream surface perforations 224. The inner upstream surface perforations 224 are located on a portion of the inner upstream surface 222 downstream of the inner upstream location 221. Each of the inner upstream surface perforations 224 are spaced apart from each other. The inner upstream surface perforations 224 may be flush with the inner upstream surface 222 and located around an entire circumference of the inner upstream surface. As such, the inner upstream surface perforations 224 are angled relative to the direction of incoming exhaust gas flow 294. The inner upstream surface perforations 224 extend through an entire thickness of the inner upstream surface 222 such that spaces located between the inner annular portion 220 and the inner surface 206 may receive exhaust gas from the exhaust passage 48. In one example, each of the inner upstream surface perforations 224 are substantially identical to the upstream exhaust pipe perforations 208 in size and shape. However, it will be appreciated that each of the inner upstream surface perforations 224 may differ from one another or from the upstream exhaust pipe perforations 208 in size and/or shape without departing from the scope of the present disclosure.

Turning now to FIG. 3, it shows a cross-sectional view 300 of the first embodiment of the mixer 200 taken along cutting plane A-A' of FIG. 2. The cross-sectional view 300 omits portions of the outer annular portion 210 and the exhaust pipe 202 to reveal interior portions of the exhaust pipe 202 and outer annular portion 210. Additionally, a shape of the inner annular portion 220 is revealed. In the cross-sectional view 300, the interior annular portion 220 is not cross-sectioned in order to illustrate an inner annular wall 328.

The inner annular wall 328 may be in face-sharing contact with and hermetically sealed to the inner surface 206 of the exhaust pipe 202. As such, gas may not flow between the inner surface 206 and the inner annular wall 328. Welds, fusions, adhesives, and the like may be used to physically couple the inner annular wall 328 to the inner surface 206 of the exhaust pipe.

The inner annular wall 328 may comprise a length along the x-axis equal to an entire length of the inner annular portion 220. Specifically, the inner annular wall 328 extends from the inner upstream location 221 to an inner downstream location 321 of the inner annular portion 220. The inner downstream location 321 may be substantially similar to the inner upstream location 221 in that both locations are flush with and/or smooth to the inner surface 206 of the exhaust pipe. A circumference of the inner downstream location 321 is substantially equal to a circumference of the inner upstream location 221.

The inner upstream surface 222 extends from the inner upstream location 221 in a downward direction and may intersect with an inner downstream surface 322, which extends from the inner downstream location 321 in an upstream direction. In one example, the inner upstream surface 222 and the inner downstream surface 322 are equal in length and shape such that the inner annular portion 220 is symmetric about the central axis 294 and a vertical axis 392. A distance between the inner upstream surface and the inner surface 206 of the exhaust pipe 202 increases from the inner upstream location 221 to an annular intersect 324, where the inner upstream 222 and inner downstream 322 surfaces meet. A distance between the inner downstream location 322 and the inner surface 206 of the exhaust pipe 202 decreases from the annular intersect 324 to the inner downstream location 321. The inner upstream surface 222 and the inner downstream surface 322 may both be convex or concave relative to the direction of exhaust flow 294. Additionally or alternatively, the inner upstream surface 222 and the inner downstream surface 322 may be differently contoured and/or curved such that the inner upstream surface 222 is concave and the inner downstream surface 322 is convex or vice-versa. In some embodiments, the inner upstream surface 222 and the inner downstream surface 322 may be linear and oblique to the direction of exhaust gas flow 294.

As such, the inner annular portion 220 may constrict and/or obstruct a portion of the exhaust passage 48 between the inner upstream 221 and inner downstream 321 locations. A greatest area of constriction may coincide with the annular intersect 324. Thus, a diameter of a cross-sectional flow through area of the exhaust passage 48 taken along a plane parallel to the y- and z-axes is smallest at the annular intersect 324. The annular intersect 324 is arranged along a vertical axis 392 of the inner annular portion 220.

As described above, the inner upstream surface 222 comprises inner upstream surface perforations 224 configured to admit gas into a space of the inner annular portion 220. Similarly, the inner downstream surface 322 comprises inner downstream surface perforations 323, arranged between the annular intersect 324 and the inner downstream location 321, which may be configured to admit and/or expel gas into and/or out of the space of the inner annular portion 220. The inner downstream surface perforations 323 may be spaced apart from one another along a circumference of the inner downstream surface 322. Likewise, the annular intersect 324 comprises annular intersect perforations 326 configured to expel gas from the space of the inner annular portion 220 to the exhaust passage 48. The annular intersect perforations 326 may be spaced apart from one another and arranged along an entire circumference of the annular intersect 324. In one example, the inner upstream surface perforations 224, inner downstream surface perforations 323, and annular intersect perforations 326 may be similarly shaped and sized (e.g., oblong). It will be appreciated that one or more of the inner upstream surface perforations 224, inner downstream surface perforations 323, and annular intersect perforations 326 may be differently shaped and/or sized from one another such as square shaped, rectangular, triangular, hexagonal, and other suitable shapes without departing from the scope of the present disclosure. Each of the inner upstream surface perforations 224, inner downstream surface perforations 323, and annular intersect perforations 326 may be arranged such that its opening is angled and/or perpendicular to the direction of exhaust gas flow 294. Additionally, each of the inner upstream surface perforations 224 and inner downstream surface perforations 323 may be radially aligned about the central axis 292. It will be appreciated that the perforations may be misaligned without departing from the scope of the present disclosure.

The space of the interior annular portion 220 is defined by the inner annular wall 328, the inner upstream surface 222, and the inner downstream surface 322. Each of these surfaces is impervious to gas flow. As such, gas may enter and leave the inner annular portion via the inner upstream surface perforations 224, inner downstream surface perforations 323, and annular intersect perforations 326.

As will be described below, the inner annular portion 220 and the outer annular portion 210 are configured to function synergistically to promote exhaust gas flow. As shown in FIG. 5, the outer 210 and inner 220 annular portions may fluidly communicate via one or more openings spaced about a spiral fin 312 arranged between the outer annular portion 210 and the outer surface 204 of the exhaust pipe 202.

The spiral fin 312 may be physically coupled to one or more of the outer surface 204 and the outer annular wall 214. A height of the spiral fin 312 may be substantially equal to a distance between the outer annular wall 214 and the outer surface 204. The spiral fin 312 may wrap around the outer surface 204 in a downstream direction such that a first end 314 and a second end 316 of the spiral fin 312 are spaced apart and do not touch one another. The first end 314 is upstream of the second end 316. In one example, the spiral fin 312 wraps around exactly 360° of the outer surface 204 such that the first end 314 and the second end 316 are aligned with one another along the x-axis. In some examples, the spiral fin 312 wraps around greater than or less than 360° such that the first 314 and second 316 ends are not aligned along the x-axis. The spiral fin 312 wraps around the outer surface 204 in a counterclockwise direction. However, the spiral fin 312 may wrap around the outer surface 204 in a clockwise direction without departing from the scope of the present disclosure. The spiral fin 312 may be a single, contiguous piece impervious to gas flow. Additionally or alternatively, the spiral fin 312 may comprise one or more openings configured to admit gas through the spiral opening 312. The spiral fin 312 may not comprise a flow space located therein and as a result, the spiral fin 312 may be solid.

An upstream portion of the spiral fin 312 is located downstream of the reductant injector 82. As such, an injection space and/or injection area is located between the injector 82 and the spiral fin 312. This may limit reductant from impinging onto surfaces of the spiral fin 312 before mixing with exhaust gas as will be described below in FIG. 5. The spiral fin 312 is shown in greater detail below with respect to FIG. 4.

Figure 4:
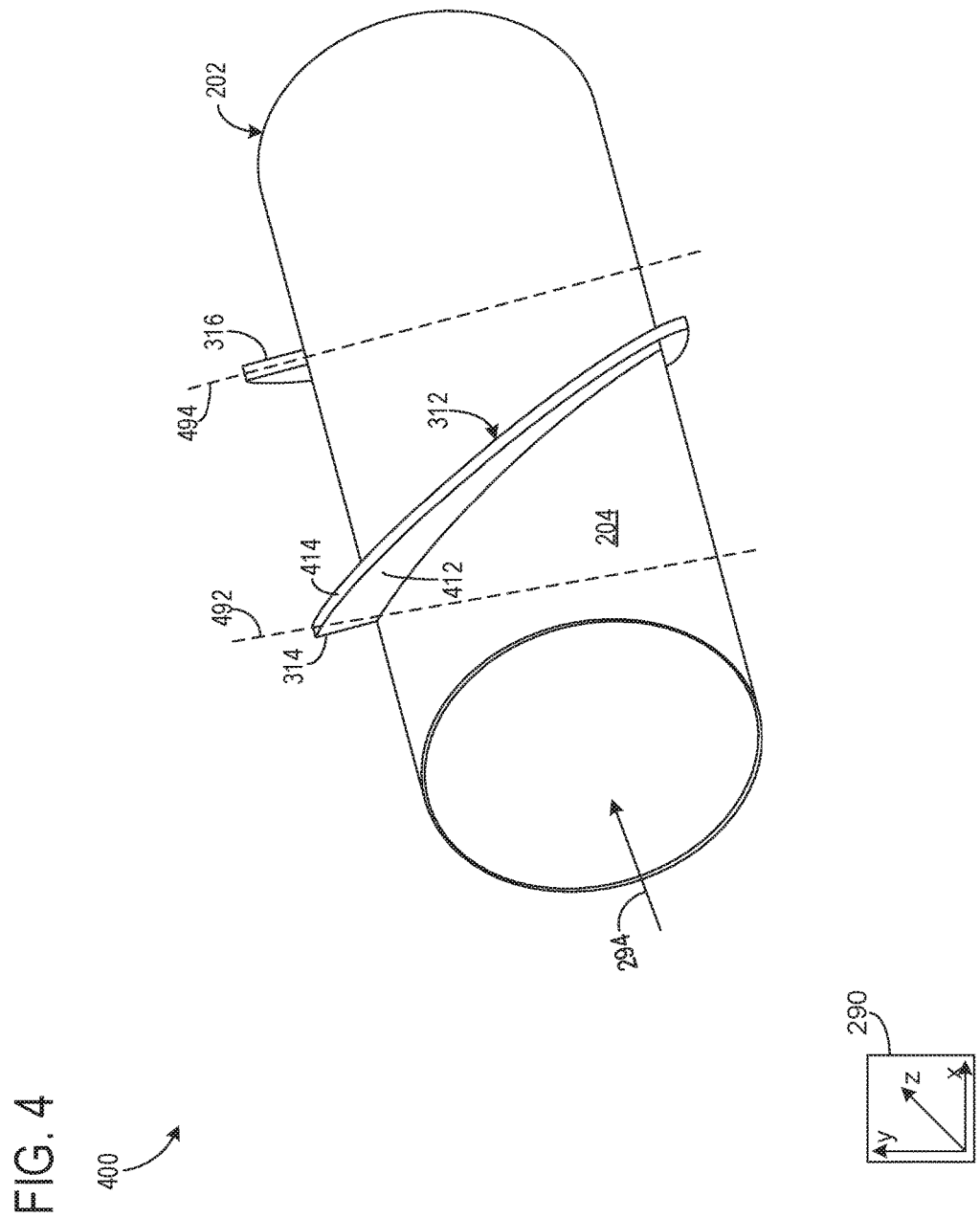
FIG. 4 shows a spiral fin traversing around an outer surface of an exhaust pipe.
Figure 5:
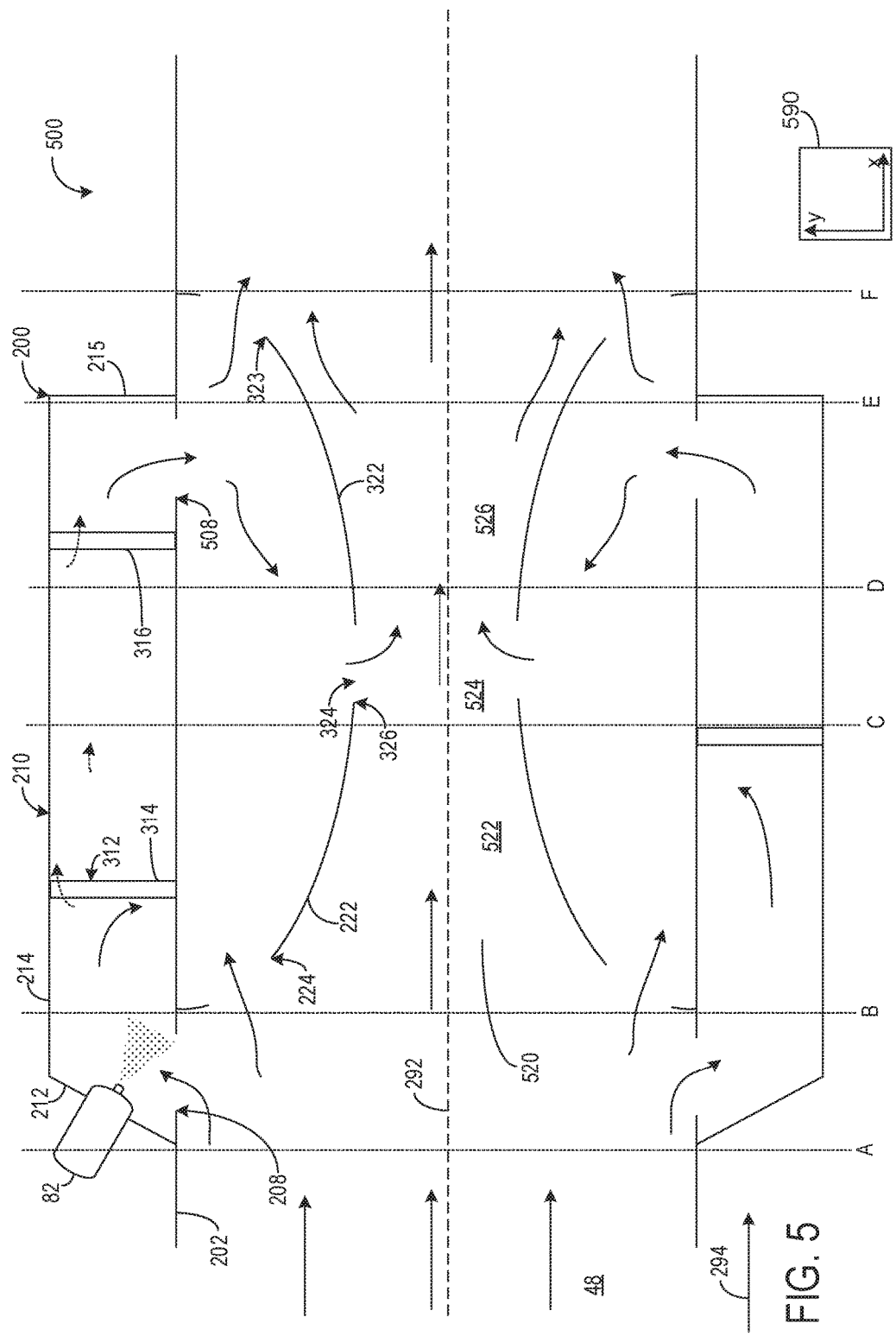
FIG. 5 shows an example exhaust gas flow through a cross-sectional view of the first embodiment.

Turning now to FIG. 4, it shows a perspective view 400 of the spiral fin 312 located around the outer surface 204 of the exhaust pipe 202. The outer annular portion 210 is omitted from the view 400 to illustrate a shape and direction of the spiral fin 312. The spiral fin 312 is shown traversing the outer surface 204 in a clockwise direction. The fin 312 curves in the downstream direction along the x-axis. A cross-section of the spiral fin 312 along a plane parallel to the y- and z-axes may be substantially rectangular (e.g., similar to a shape of the first 314 and second 316 ends). A front surface 412 of the spiral fin 312 is shown facing a direction opposite the direction of exhaust gas flow 294. A rear surface (not shown) is opposite to the front surface 412 and faces a direction parallel to the direction of exhaust gas flow 294.

As depicted, the first 314 and second ends 316 are spaced apart from one another. The first end 314 may be located about a first axis 492 and the second end 316 may be located about a second axis downstream of the first axis 492. The fin 312 wraps around the exhaust pipe 202 between the first 492 and second 494 axes. Gas may flow freely between the first 314 and second 316 ends without interacting with the spiral fin 312. As described above, the spiral fin 312 is physically coupled to the outer annular wall (e.g., outer annular wall 214 of FIG. 3). Specifically, an outer fin surface 414 is hermetically sealed with the outer annular wall such that gas may not flow therebetween. Thus, exhaust gas in the outer annular portion (e.g., outer annular portion 210 of FIG. 3) may follow a path of the spiral fin 312. In this way, the spiral fin may impart a swirl and/or turbulence to exhaust gas in the outer annular portion.

Thus, a mixer comprises an outer annular portion exterior to an exhaust pipe and an inner annular portion interior to the exhaust pipe, where the outer annular portion comprises a spiral fin extending around the exhaust pipe in a downstream direction. The spiral fins comprises a first end arranged along a first axis and a second end arranged along a second axis, and where the first axis is spaced away from and located upstream of the second axis relative to a direction of exhaust gas flow from an engine. The outer annular portion is fluidly coupled to an exhaust passage of the exhaust pipe upstream of the first axis, and where the outer annular portion is fluidly coupled to the interior annular portion downstream of the second axis. The outer annular portion and the inner annular portion are hollow and symmetric about a central axis of the exhaust pipe. The outer annular portion comprises an outer surface angled relative to the exhaust pipe, and where an injector is coupled to the outer surface and positioned to inject into a flow space formed between the outer annular portion and the exhaust pipe. The inner annular portion is curved and comprises a C-shaped cross-section in a downstream direction, and where the inner annular portion comprises a venturi passage located along its central axis. The inner annular portion is fluidly coupled to an exhaust passage at each of a venturi inlet, a venturi throat, and a venturi outlet of the venturi passage. The outer annular portion and the inner annular portion are fluidly coupled via one or more perforations.

Turning now to FIG. 5, it shows an embodiment 500 of the mixer 200 along the cutting plane A-A' of FIG. 2. Specifically, the mixer 200 is bisected along the central axis 294. In this way, interior flow spaces of the outer 210 and inner 220 annular portions are illustrated with exhaust gas flowing therethrough. Embodiment 500 is meant to be one example of a plurality of examples of exhaust gas flowing through the mixer 200 as reductant is being injected from the injector 82. Additionally, exhaust gas may flow through the mixer 200 and undergo similar mixing in the absence of a reductant injection.

An axes system 590 includes two axes, namely an x-axis parallel to the horizontal direction and a y-axis parallel to the vertical direction. The central axis 294 and the vertical axis 392 are included herein. As shown, the central axis 294 is perpendicular to the vertical axis 394.

In the embodiment 500, unlabeled arrows indicate where there is space for exhaust gas to flow while solid lines represent boundaries blocking exhaust gas flow. Gaps and/or spaces and/or interruptions between the solid lines may illustrate one or more of the perforations described above suitable for admitting or expelling exhaust gas from the outer 210 and inner 220 annular portions. It will be appreciate that a directionality of one or more of the arrows depicted in the embodiment 500 may be reversed and/or flipped without departing from the scope of the present disclosure.

Downstream exhaust pipe perforations 508 are shown located between the extreme end 215 and the spiral fin 312. Specifically, each of the downstream exhaust pipe perforations 508 are located downstream of the second end 316 of the spiral fin 312. The downstream exhaust pipe perforations 508 may be substantially similar to the upstream exhaust pipe perforations 208 in size and shape. However, it will be appreciated that the downstream exhaust pipe perforations 508 may differ from the upstream exhaust pipe perforations 208 in size and shape without departing from the scope of the present disclosure.

The downstream exhaust pipe perforations 508 may extend around an entire circumference of the exhaust pipe 202. The downstream exhaust pipe perforations 508 are spaced away from each other. In the example of FIG. 5, each of the downstream exhaust pipe perforations 508 is radially aligned with each of the upstream exhaust pipe perforations 208, inner upstream surface perforations 224, annular intersect perforations 326, and inner downstream surface perforations 323. In one example, there are exactly eight of each of the upstream exhaust pipe perforations 208, inner upstream surface perforations 224, annular intersect perforations 326, inner downstream surface perforation 323, and downstream exhaust pipe perforations 508. There may be other numbers of each of the perforations (e.g., less than or greater than eight) without departing from the scope of the present disclosure.

The downstream exhaust pipe perforations 508 fluidly couples the outer annular portion 210 to the inner annular portion 220. Thus, the outer annular portion 210 may receive and expel exhaust gas via the upstream exhaust pipe perforation 208 and the downstream exhaust pipe perforations 508. The inner annular portion 220 may receive and expel exhaust gas via one or more of the inner upstream surface perforations 224, annular intersect perforations 326, and inner downstream surface perforations 323. Exhaust flow through each of these perforations and the exhaust passage 48 is described below.

The exhaust passage 48 and mixer 200 are dissected into by six dashed lines A through F, which may divide the embodiment 500 into zones. Exhaust gas flow is described in relation to each of these dashed lines.

Upstream of dashed line A, exhaust gas may flow in a substantially linear direction parallel to the central axis 292. Exhaust gas may be unperturbed and has not reached the mixer 200. The exhaust gas upstream of the dashed line A is free of reductant. Herein, reductant may comprise urea, fuel, and the like which are suitable for reducing an SCR catalyst located downstream of the mixer 200.

Between dashed lines A and B, exhaust gas may continue flowing uninterruptedly through the exhaust passage 48 without interacting with the mixer 200. In one example, exhaust gas adjacent to the central axis 292 continues flowing through the portion of the exhaust passage between dashed lines A and B without interacting with the mixer 200. Exhaust gas proximal to the exhaust pipe 202 may flow through the upstream exhaust pipe perforations 208 and into the outer annular portion 210. Exhaust gas flowing through the upstream exhaust pipe perforations 208 flows in a radially outward direction perpendicular to the direction of exhaust gas flow 294, in one example. As shown, the exhaust gas flows into a portion of the outer annular portion 210 upstream of the spiral fin 312. As such, exhaust gas between dashed lines A and B does not interact with the spiral fin 312.

The reductant injector 82 is positioned to inject reductant between dashes lines A and B in the outer annular portion 210 upstream of the spiral fin 312. As shown, the reductant injector 82 is fixedly coupled to the outer upstream surface 212 and injects reductant in a direction substantially perpendicular to the outer upstream surface 212 and oblique to the direction of exhaust gas flow 294. It will be appreciated that the injector 82 may be position at other angles greater than or less than perpendicular without departing from the scope of the present disclosure. Exhaust gas flowing into the top portion of the outer annular portion 210 adjacent the reductant injector 82 may mix with injected reductant. In one example, the reductant is already in a gaseous state prior to mixing with exhaust gas. Alternatively, the reductant is a liquid and vaporizes upon mixing with exhaust gas.

As described above, the inner annular portion 220 constricts the exhaust passage 48. Herein, this constriction may be described as a venturi passage 520, wherein the venturi passage 520 comprises a venturi inlet 522 between dashed lines B and C, a venturi throat 524 located between dashed lines C and D, and a venturi outlet 526 located between dashed lines D and E. The venturi passage 520 may provide vacuum to the outer 210 and inner 220 annular portions of the mixer 200 while simultaneously adjusting an exhaust gas flow speed and/or velocity through the exhaust passage. A combination of these effects may synergistically function to improve exhaust gas mixing.

Between dashed lines B and C, exhaust gas may enter and flow through the venturi inlet 522 of the venturi passage 520. The venturi inlet 522 corresponds to the inner upstream surface 222 of the inner annular portion 220. As such, a cross-sectional flow through area of the venturi inlet 522 decreases along the y-axis in the downstream direction parallel to the x-axis. Thus, as exhaust gas flows through the venturi inlet 522, its flow rate may increase. Exhaust gas flows from the venturi inlet 522 to the venturi throat 524 located between dashed lines C and D. The venturi throat 524 corresponds to the annular intersect of the inner annular portion 220. The exhaust gas flow speed and/or velocity may increase as exhaust gas flows from the venturi inlet 522 to the venturi throat 524. In one example, the exhaust gas flow speed and/or velocity in the venturi passage 520 is highest at the venturi throat 524. As such, a pressure of the exhaust gas may correspondingly decrease as the exhaust gas flows from the venturi inlet 522 to the venturi throat 524. In this way, vacuum is generated at the venturi throat 524, where the vacuum may be supplied to an interior space of the inner annular portion 220 via the annular intersect perforations 326. The vacuum in the interior space of the inner annular portion 220 may also flow to the outer annular portion 210 via the downstream exhaust pipe perforations 508. This vacuum may promote exhaust gas flow from the exhaust passage 48 to the outer 210 and inner 220 annular portions. In one example, the vacuum may promote exhaust gas flow through the inner upstream surface perforations 224 to the interior space of the inner annular portion 220 between dashed lines B and C. Exhaust gas flow through the inner upstream surface perforations 224 may flow in a direction oblique and/or parallel to the direction of exhaust gas flow 294. Additionally, the vacuum may promote exhaust gas flow through the upstream exhaust pipe perforations 208 to the outer annular portion 210. In this way, turbulence and/or spin is imparted onto the exhaust gas, thereby increasing exhaust gas homogeneity, independent of the reductant injection occurring. Exhaust gas may also ricochet off the inner upstream surface 222 while flowing through the venturi inlet 522, thereby increasing a misdirection of exhaust gas flow through the exhaust passage 48.

Exhaust gas in the outer annular portion 210 between dashed lines B and D may follow a flow path of the spiral fin 312. This is shown by solid line arrows. As such, the exhaust gas may flow around the exhaust pipe 202 in a 360° direction and along a body of the spiral fin 312. Alternatively, exhaust gas in the outer annular portion 210 may avoid the spiral fin 312 as shown by dashed line arrows. As shown, the exhaust gas may flow around the first end 314 of the spiral fin 312 through spaces between the outer annular portion 210 and the exhaust pipe 202. These spaces are further illustrated in FIGS. 3 and 4.

Between dashed lines D and E, exhaust gases from the outer annular portion 210 and the inner annular portion 220 may mix. For example, exhaust gas from between the dashed lines A and B mixed with reductant may flow around the outer annular portion 210 and follow a flow path of the spiral fin 312. After flowing around an entire length of the spiral fin 312, the exhaust gas mix with reductant may flow into the interior space of the inner annular portion 220 via the downstream exhaust pipe perforations 508 and mix with exhaust gas free of reductant. Alternatively, exhaust gas from the interior space of the inner annular portion 220 may flow into the outer annular portion 210 via the downstream exhaust pipe perforations 508. Exhaust gas between lines D and E in the inner annular portion 220 may flow toward one or more of the annular intersect perforation 328 and the inner downstream surface perforations 323. Exhaust gas in the inner annular portion 220 may flow through the annular intersect perforations 326 to the venturi throat 224 in a radially inward direction perpendicular to the direction of exhaust gas flow 294. Furthermore, the exhaust gas flowing out of the annular intersect perforations 326 may flow along the central axis 292 of the exhaust passage 48. Exhaust gas in the inner annular portion may flow through the inner downstream surface perforations 323 proximal to the exhaust pipe 202 in a direction angled to the direction of exhaust gas flow 294, wherein the direction may be oblique, parallel, or perpendicular to the direction of exhaust gas flow 294.

Between dashed lines E and F, exhaust gas continues to mix due to the swirl, spin, and turbulence imparted onto it from the mixer 200. As such, the reductant injection that occurred in a top portion of the outer annular portion 210 between dashed lines A and B may be dispersed by the various exhaust gas flows described above. In this way, reductant delivery to the SCR located downstream of the mixer 200 may be more efficient compared to other exhaust gas mixing systems.

A method comprises flowing exhaust gas from an exhaust passage to an outer passage of a mixer located exterior to the exhaust passage, and where the outer passage surrounds an exhaust pipe of the exhaust passage, wherein the outer passage receives and expels exhaust gas at one or more perforations upstream and downstream of one or more curved fins. A reductant injector is positioned to inject into a location between surfaces of the mixer and one or more of the fins. Flowing exhaust gas further includes flowing exhaust gas through a constriction of the exhaust passage formed by an inner portion of the exhaust passage, wherein the inner portion of the exhaust passage is fluidly coupled to a downstream portion of the outer passage. The mixer is fixed and immovable, and where the mixer does not rotate and slide. There are no additional inlets or other outlets of the mixer other than the perforations fluidly coupling the mixer to the exhaust passage.

Turning now to FIG. 6, it shows a second embodiment of a mixer 600. In some examples, the mixer 600 may be used similarly to the mixer 80 of FIG. 1. As such, components previously introduced may be similarly numbered in subsequent figures. The mixer 600 is shown coupled to interior and exterior portions of an exhaust pipe 602, which may house the exhaust passage 48. The mixer 600 and exhaust pipe 602 comprise various contours and/or cut-outs which may operate synergistically to increase exhaust gas mixing, as will be described herein.

An axis system 690 includes three axes, namely an x-axis parallel to a horizontal direction, a y-axis parallel to a vertical direction, and a z-axis perpendicular to both the x- and y-axes. A direction of gravity is shown by arrow 699. As such, arrow 699 is herein referred to as gravity 699. Dashed line 692 indicates a central axis of one or more of the exhaust pipe 602 and exhaust passage 48. Herein, the dashed line 692 is referred to as central axis 692. In one example, the central axis 692 is parallel to the x-axis. Arrow 694 indicates a general direction of exhaust gas flow through the exhaust passage 48. In one example, the direction of exhaust gas flow 694 is parallel to the central axis 692. A length of the mixer 600 may describe a distance of the mixer 600 along the x-axis. A height of the mixer 600 may describe a distance of the mixer 600 along the y-axis. Lastly, a thickness of the mixer 600 may describe a distance of the mixer 600 along the z-axis.

The mixer 600 may comprise of one or more of aluminum, carbon fiber, magnesium, iron, steel, plastic, and a combination thereof. The mixer 600 may be physically coupled to the exhaust pipe 602 via one or more of welds, fusions, adhesives, and screws. In this way, the mixer 600 is immovable. Additionally, the mixer 600 may not be hydraulically, electrically, and mechanically powered. Thus, the mixer 600 may be a static mixer and may not slide, rotate, oscillate, or perform any other type of movement during vehicle operations. In one example, the mixer 600 is fixed and immovable.

The mixer 600 is located downstream of the reductant injector 82. The injector 82 is positioned to inject directly into the exhaust passage 48 in a direction oblique to the direction of exhaust gas flow 694. In one example, an injection angle is less than 90° to the direction of exhaust gas flow. Alternatively, the injection angle may be exactly 90° without departing from the scope of the present disclosure.

The mixer 600 comprises an outer portion 610 located outside of a physically coupled to an outer surface 604 of the exhaust pipe 602. The outer portion 610 may comprise an upstream surface 612 upstream of a downstream surface 614 relative to a direction of exhaust gas flow. The upstream surface 612 may be perpendicular to the outer surface 604. The downstream surface 614 may be angled relative to the outer surface 604. The upstream 612 and downstream 614 surfaces may span an entire circumference of the exhaust pipe 602. As such, the upstream 612 and downstream 614 surfaces may be symmetrical about the central axis 692. In one example, the coupling between the upstream surface and the outer surface 604 of the exhaust pipe 602 may be hermetically sealed. Likewise, the coupling between the downstream surface 614 and the outer surface 604 of the exhaust pipe 602 may also be hermetically sealed. In this way, exhaust gas may not flow between the outer surface 604 and one or more of the upstream 612 and downstream 614 surfaces to an engine and/or ambient atmosphere.

An outer annular surface 616 may be physically coupled to the upstream surface 612 at an upstream extreme end. In one example, the outer annular surface 616 is hermetically sealed to the upstream surface 612. Similarly, the outer annular surface 616 may be physically coupled to the downstream surface 614 at a downstream extreme end. As such, the outer annular surface 616 is fixed to both the upstream 612 and downstream 614 surfaces at opposite extreme ends. In one example, the outer annular surface 616 is hermetically sealed to the downstream surface 614.

The outer annular surface 616 may be spaced away from the outer surface 604 of the exhaust pipe 602. An inner portion 620 may be arranged between the outer annular surface 616 and the outer surface 604. In one example, surfaces of the inner portion 620 are spaced away from each of the upstream surface 612, downstream surface 614, the outer annular surface 616, and outer surface 604. The inner portion 620 comprises a free end 622, a downstream wall 624, and an inner annular surface 626. The inner annular surface 626 may be concentric with the exhaust pipe 602 and the outer annular surface 616. The downstream wall 624 is adjacent to the downstream surface 614 and parallel to the upstream surface 612. The free end 622 is adjacent to and spaced away from the upstream surface 612. As such, the inner portion 620 is cantilevered to the outer surface 604 of the exhaust pipe 602, in one example.

A flow space 630 is located between the outer portion 610 and the exhaust pipe 602. The flow space 630 may be divided into two passages, namely an inner passage 632 and an outer passage 634. The inner passage 632 may be located between the inner portion 620 and the outer surface 604. A height of the inner passage 632 may be similar to one-sixth of the diameter of the exhaust pipe 602. A height of the outer passage 634 may be substantially equal to one-eighth of the diameter of the exhaust pipe 602. The inner passage 632 may be fluidly coupled to the outer passage 634 at an intersection of the passages between the free end 622 and the upstream surface 612. Due to the arrangement of the inner portion 620, the inner passage 632 may be configured to conduct exhaust gas in a direction opposite to the direction of exhaust gas 694. Exhaust gas in the flow space 630 turns in a direction perpendicular to the direction of exhaust gas flow 694 as exhaust gas flows from the inner passage 632 to the outer passage 634. Exhaust gas in the outer passage 634 may flow in a direction parallel to the direction of exhaust gas flow 694. In this way, exhaust gas in the flow space 630 may flow in a substantially U-shaped direction.

The flow space 630 may be fluidly coupled to the exhaust passage 48 via one or more perforations. In one example, the inner passage 632 is directly coupled to the exhaust passage 48 via upstream perforations 642. Similarly, the outer passage 634 is directly coupled to the exhaust passage via downstream perforations 644. The upstream 642 and downstream 644 perforations may function as both inlets and outlets for the inner 632 and outer 634 passages, respectively. The upstream 642 and downstream 644 perforations are elliptical, in one example. However, the upstream 642 and downstream 644 perforations may be other suitable shapes, for example, circular, rectangular, triangular, and the like without departing from the scope of the present disclosure. Each of the upstream 642 and downstream 644 perforations may be similarly shaped and sized. In one example, each of the upstream 642 and downstream 644 perforations is circular and comprises a diameter between 8-12 millimeters. However, each of the upstream 642 and downstream 644 perforations may be differently shaped and/or sized without departing from the scope of the present disclosure. For example, one or more of the upstream 642 and downstream 644 perforations may be triangular, while a remainder of the upstream 642 and downstream 644 perforations may be elliptical. The upstream 642 and downstream 644 perforations may be radially aligned along the exhaust passage 48. Alternatively, the upstream 642 and downstream 644 perforations may be radially misaligned.

The upstream 642 and downstream 644 perforations extend through an entire thickness of the exhaust pipe 602 and are arranged adjacent to upstream blades 652 and/or fins 652 and downstream blades 662 and/or fins 662. Specifically, the upstream perforations 642 are located directly upstream of the upstream blades 652. Likewise, the downstream perforations 652 are located directly upstream of the downstream blades 662. Additionally, the downstream perforations 644 are arranged between the upstream 652 and downstream 662 blades. The upstream 652 and downstream 662 blades extend from an inner surface 606 of the exhaust pipe 602 toward the central axis 692. The upstream 652 and downstream 662 blades are fixedly coupled to the inner surface 606. In one example, the upstream 652 and downstream 662 blades are immovable and are impervious to gas flow.

Each of the upstream blades 652 may be spaced away from one another along different tangent points of a single circumference of the exhaust pipe 602. There may be two or more of the upstream blades 652 arranged about the exhaust pipe 602. In one example, a number of upstream blades 652 is equal to a number of upstream perforations 642. Alternatively, there may be different numbers of upstream blades 652 and upstream perforations 642. For example, there may be eight upstream perforations 642 and two upstream blades 652.

Likewise, each of the downstream blades 662 may be spaced away from one another along different tangent point of a single circumference of the exhaust pipe 602. The circumference about which the downstream blades 662 are arranged is located downstream of the circumference about which the upstream blades 652 are arranged. There may be two or more of the downstream blades 662 arranged about the exhaust pipe 602. In one example, a number of downstream blades 662 is equal to a number of downstream perforations. Alternatively, a number of downstream blades 662 is different than a number of downstream perforations. In one example, a number of upstream and downstream perforations are equal and a number of upstream and downstream blades are equal. As an example, a number of each of the upstream and downstream perforations is equal to twelve and a number of each of the upstream and downstream blades is equal to two. In this way, there are a total of 24 perforations and four blades.

The upstream 652 and downstream 662 blades may be radially aligned with one another along the exhaust passage 48. In one example, the blades are cascaded along the exhaust passage 48 with upstream blades 652 located directly upstream of downstream blades 662. In this way, the upstream 652 blades eclipse the downstream blades 662. In some examples, the upstream 652 and downstream 662 blades may be radially misaligned such that the upstream blades 652 do not eclipse the downstream blades 662.

The upstream blades 652 may extend in the upstream direction opposite the direction of exhaust gas flow 694. The downstream blades 662 may extend in the downstream direction parallel to the direction of exhaust gas flow 694. In one example, both of the upstream 652 and downstream 662 blades are twisted. However, the upstream 652 and downstream 662 blades may be curved, bent, contoured, and the like without departing from the scope of the present disclosure. The upstream 652 and downstream 662 blades are described in greater detail in FIGS. 7A and 7B, respectively.

Thus, a system comprises an annular mixing passage located outside of an exhaust pipe, where the mixing passage is divided into inner and outer passages, the inner passage is fluidly coupled to an exhaust passage at a location upstream one or more first blades, and where the outer passage is fluidly coupled to the exhaust passage at a location downstream of one or more first blades and upstream of one or more second blades. The first blades are twisted in a counterclockwise direction and the second blades are twisted in a clockwise direction. The first and second blades comprise free ends proximal to a central axis of the exhaust passage. The inner passage is located between an inner annular surface and the exhaust pipe, and where the inner annular surface is cantilevered to the exhaust pipe. The outer passage is located between an outer annular surface and the inner annular surface, and where the outer annular surface and the inner annular surface extend entirely around a circumference of the exhaust pipe. The first and second blades are fixedly coupled to the exhaust pipe and extend in upstream and downstream directions, respectively.

Figure 7B:
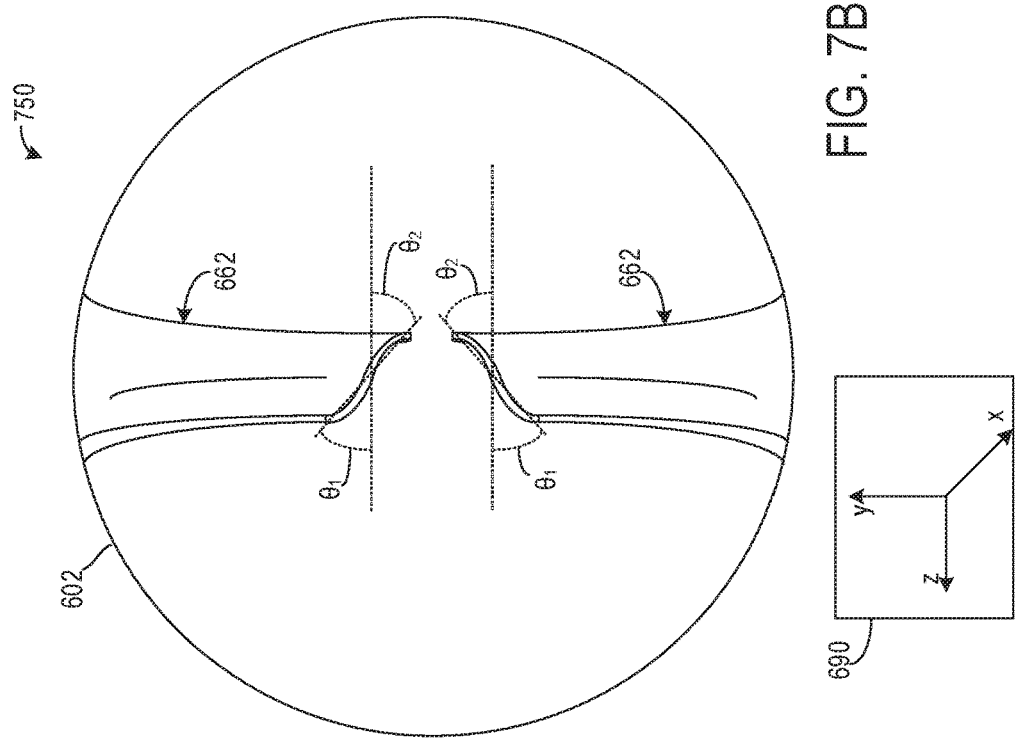
FIGS. 7A and 7B show twisted blades of the second embodiment.
Figure 7A:
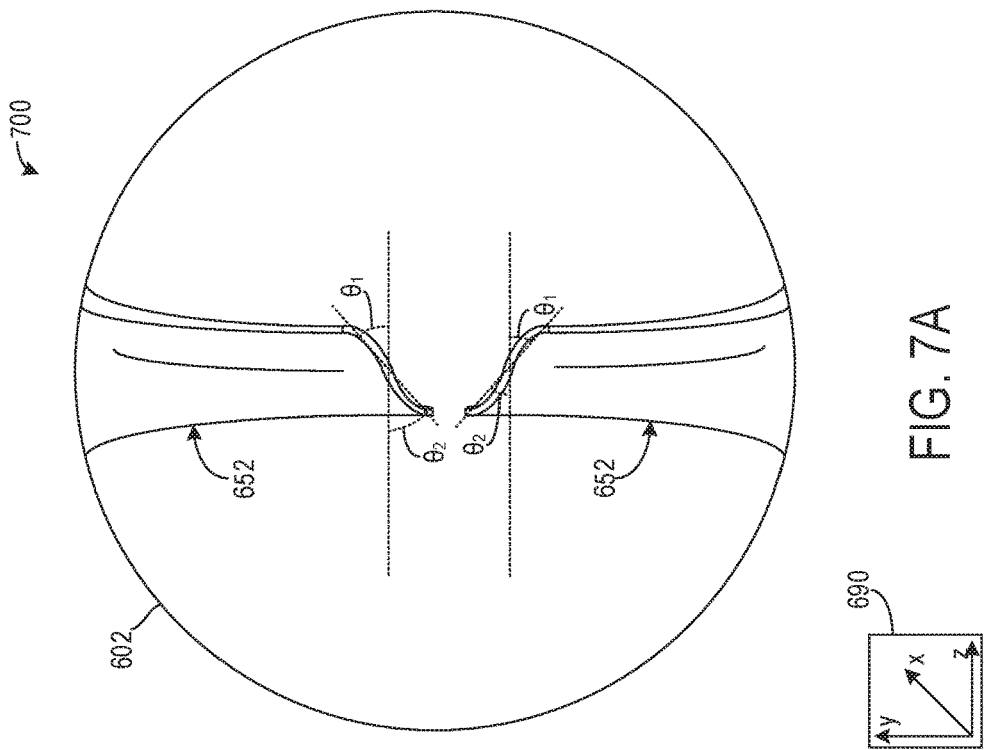
Figure 8:
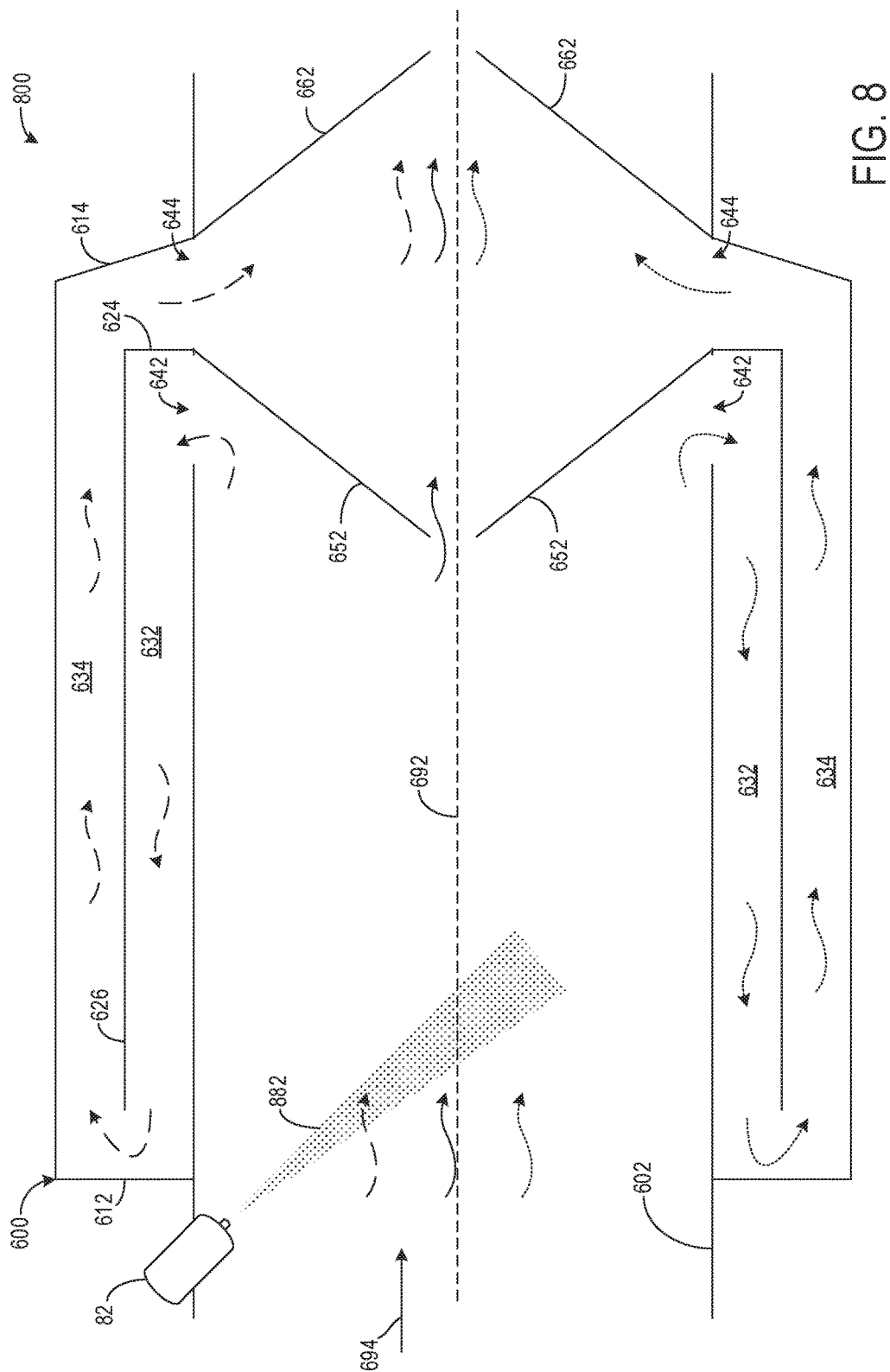
FIG. 8 shows an example exhaust gas flow through a cross-sectional view of the second embodiment.

Turning now to FIGS. 7A and 7B, they show perspective views 700 and 750 of the upstream 652 and downstream 662 blades, respectively. In one example, the perspective view 700 is a face-on view 700 of the upstream blades 652, parallel to a direction of exhaust gas flow (e.g., exhaust gas flow 694 of FIG. 6 parallel to the positive x-axis). Similarly, the perspective view 750 is a face-on view 750 of the downstream blades 662, opposite to a direction of exhaust gas flow (e.g., exhaust gas flow 694 of FIG. 6 parallel to the positive x-axis).

In the views 700 and 750, the upstream 652 and downstream 662 blades extend toward a viewer in upstream and downstream directions, respectively. The upstream 652 and downstream 662 blades are twisted such that the blades may impart a swirl as exhaust gas contacts one or more of the upstream 652 and downstream 662 blades. Specifically, the upstream blades 652 are twisted such that a free end 702 creates first and second angles $\theta_1$ and $\theta_2$, respectively. The first and second angles $\theta_1$ and $\theta_2$ are relative to an original plane about which the blades extend. As such, the upstream blades 652 form a first angle $\theta_1$ above the original plane and a second angle $\theta_2$ below the plane. Similarly, the downstream blades 662 form a first angle $\theta_1$ above the original plane and a second angle $\theta_2$ below the plane. In one example, the first and second angles $\theta_1$ and $\theta_2$, respectively, are substantially equal. In this way, the upstream 652 and downstream 662 blades are symmetric about the x-axis. In one example, the first and second angles $\theta_1$ and $\theta_2$ are substantially equal to 30°. Alternatively, the respective first and second angles $\theta_1$ and $\theta_2$ may be different such that the upstream 652 and downstream 662 blades are asymmetric. Thus, the first angle $\theta_1$ may be greater than or smaller than the second angle $\theta_2$.

Turning now to FIG. 8, it shows an embodiment 800 illustrating an example exhaust gas flow through the mixer 600 simultaneous to a reductant injection occurring. However, exhaust gas may flow through the mixer 600 and mix in the absence of a reductant injection. At any rate, the mixer 600 is configured to increase a homogeneity of exhaust gas flowing through the exhaust passage 48 upstream of an exhaust device (e.g., aftertreatment device 72 of FIG. 1), wherein the exhaust device may be an SCR, particulate filter, three-way catalyst, exhaust sensor, $NO_x$ trap, and the like.

Exhaust gas is shown flowing from a left side to a right side of the figure. Large dash arrows depict portions of exhaust gas initially flowing above the central axis 692 upstream of the mixer 600. Small dash arrows depict portions of exhaust gas initially flowing below the central axis 692 upstream of the mixer 600. Large dashes are bigger than small dashes. Solid line arrows depict portions of exhaust gas initially flowing along the central axis 692 upstream of the mixer 600.

Exhaust gas upstream of the injection 882 from the reductant injector 82 is free of reductant. In one example, the reductant is urea. However, the reductant may be fuel or the like without departing from the scope of the present disclosure.

Large dash arrows may flow into one or more upstream blades 652 located above the central axis 692, where the exhaust gas may be directed through one or more upstream perforations 642 located above the central axis. The large dash arrows flow into a portion of the inner passage 632 located above the central axis 692. However, as described above with respect to FIG. 6, the inner passage 632 traverses an entire circumference of the exhaust pipe 602.

Large dash arrows may flow through the inner passage 632 in a direction substantially opposite to the direction of exhaust gas flow 694. Once the large dash arrows reach a portion of the inner passage 632 adjacent to the upstream surface 612, the large dash arrows may turn 180° and flow up into the outer passage 634. As such, exhaust gas does not flow through the inner annular surface 626, in one example. Large dash arrows flow through a portion of the outer passage 634 located above the central axis 692 in a direction substantially parallel to the direction of exhaust gas flow 694. However, it will be appreciated that exhaust gas in the outer passage 634 may turn in directions oblique and/or perpendicular to the direction of exhaust gas flow 694 and flow around the exhaust pipe 602. In one example, exhaust gas in the portion of the outer passage 634 above the central axis 692 may turn and flow into a portion of the outer passage 634 below the central axis 692.

The large dash exhaust gas arrows in the outer passage 634 may turn in a direction perpendicular to exhaust gas flow as it reaches the downstream surface 614. The exhaust gas flows between the downstream wall 624 and the downstream surface 614 toward one or more of the downstream perforations 644. Large dash arrow exhaust gas may flow through one or more of the downstream perforations 644 in a radially inward direction perpendicular to exhaust gas flow 694 before turning and flowing in a direction parallel to the direction of exhaust gas flow 694. The large dash exhaust gas arrows may merge with solid line exhaust gas arrow in an area of the exhaust passage 48 between the upstream 652 and downstream 662 blades.

Small dash exhaust gas arrows may flow similarly to the large dash exhaust gas arrows described above. It will be appreciated that the small dash exhaust gas arrows may mix with the large dash exhaust gas arrows in one or more of the inner 632 and outer 634 passages. In this way, exhaust gas may be diverted from the exhaust passage 48 and flowed out of the exhaust pipe 602 to one or more of the inner 632 and outer 632 passage, where the exhaust gas may mix and flow around an outside of the exhaust pipe 602 before returning to the exhaust passage 48. The small dash exhaust gas arrows may also flow through one or more of the downstream perforations 644 and merge with solid line exhaust gas arrows in a location between the upstream 652 and downstream 662 blades. In this way, portions of exhaust gas free of reductant may combine and mix with portions of exhaust gas comprising reductant. Furthermore, a homogeneity of exhaust gas may increase as it flows through the mixer 600 to due to the increased flow path of exhaust gas located outside of and fluidly coupled to the exhaust passage 48. Still furthermore, increased turbulence may be introduced to exhaust gas flowing through the mixer 600 via the upstream 652 and downstream 662 blades, which may impart a swirl in a radial direction, and the upstream 642 and downstream 644 perforations, which may receive and expel exhaust gas in a direction angled to a general direction of exhaust gas flow.

In this way, an exhaust gas mixer may increase homogeneity of exhaust gas flowing through an exhaust passage. In a first embodiment, the mixer comprises a fin surrounding an outer surface of an exhaust pipe. The fin may alter an exhaust flow in an outer passage located outside of the exhaust pipe. Thus, as exhaust gas is returned to the exhaust passage in the exhaust pipe, the exhaust gas may be increasing turbulent and increase exhaust gas mixing. In a second embodiment, the mixer comprises blades twisting in an exhaust passage. The blades may impart a swirl onto the exhaust gas and/or direct exhaust gas into a passage of the mixer located outside of the exhaust pipe. Exhaust gas in the passage outside the exhaust pipe may flow around the exhaust pipe before returning to the exhaust passage in the exhaust pipe. The technical effect of flowing exhaust gas to an exhaust passage outside or and/or exterior to the exhaust pipe is to increase an exhaust gas mixing space and increase exhaust gas homogeneity. By doing this, reductant may increasingly mix with exhaust gas as it flows through one or more of the mixers described above.

An embodiment of a mixer comprising an outer annular portion exterior to an exhaust pipe and an inner annular portion interior to the exhaust pipe, where the outer annular portion comprises a spiral fin extending around the exhaust pipe in a downstream direction. A first example of the mixer further includes where the spiral fin comprises a first end arranged along a first axis and a second end arranged along a second axis, and where the first axis is spaced away from and located upstream of the second axis relative to a direction of exhaust gas flow from an engine. A second example of the mixer, optionally including the first example, further includes where the outer annular portion is fluidly coupled to an exhaust passage of the exhaust pipe upstream of the first axis, and where the outer annular portion is fluidly coupled to the interior annular portion downstream of the second axis. A third example of the mixer, optionally including the first and/or second examples, further includes where the outer annular portion and the inner annular portion are hollow and symmetric about a central axis of the exhaust pipe. A fourth example of the mixer, optionally including one or more of the first through third examples, further includes where the outer annular portion comprises an outer surface angled relative to the exhaust pipe, and where an injector is coupled to the outer surface and positioned to inject into a flow space between the outer annular portion and the exhaust pipe. A fifth example of the mixer, optionally including one or more of the first through fourth examples, further includes where the inner annular portion is curved and comprises a C-shaped cross-section in a downstream direction, and where the inner annular portion comprises a venturi passage located along its central axis. A sixth example of the mixer, optionally including one or more of the first through fifth examples, further includes where the inner annular portion is fluidly coupled to an exhaust passage at each of a venturi inlet, a venturi throat, and a venturi outlet of the venturi passage. A seventh example of the mixer, optionally including one or more of the first through sixth examples, further includes where the outer annular portion and the inner annular portion are fluidly coupled via one or more perforations.

An embodiment of a system comprising an annular mixing passage located outside of an exhaust pipe, where the mixing passage is divided into inner and outer passages, the inner passage is fluidly coupled to an exhaust passage at a location upstream one or more first blades, and where the outer passage is fluidly coupled to the exhaust passage at a location downstream of one or more first blades and upstream of one or more second blades. A first example of the system further includes where the first blades are twisted in a counterclockwise direction and the second blades are twisted in a clockwise direction. A second example of the system, optionally including the first example, further includes where the first and second blades comprise free ends proximal to a central axis of the exhaust passage. A third example of the system, optionally including the first and/or second examples, further includes where the inner passage is located between an inner annular surface and the exhaust pipe, and where the inner annular surface is cantilevered to the exhaust pipe. A fourth example of the system, optionally including one or more of the first through third examples, further includes where the outer passage is located between an outer annular surface and the inner annular surface, and where the outer annular surface and the inner annular surface extend entirely around a circumference of the exhaust pipe. A fifth example of the system, optionally including one or more of the first through fourth examples, further includes where the first and second blades are fixedly coupled to the exhaust pipe and extend in upstream and downstream directions, respectively.

An embodiment of a method comprising flowing exhaust gas from an exhaust passage to an outer passage of a mixer located exterior to the exhaust passage, and where the outer passage surrounds an exhaust pipe of the exhaust passage, wherein the outer passage receives and expels exhaust gas at one or more perforations upstream and downstream of one or more curved fins. A first example of the method, further includes where a reductant injector positioned to inject into a location between surfaces of the mixer and one or more of the fins. A second example of the method, optionally including the first example, further includes where flowing exhaust gas further includes flowing exhaust gas through a constriction of the exhaust passage formed by an inner portion of the exhaust passage, wherein the inner portion of the exhaust passage is fluidly coupled to a downstream portion of the outer passage. A third example of the method, optionally including the first and/or second examples, further includes where exhaust gas flows in a U-shape through the outer passage. A fourth example of the method, optionally including one or more of the first through third examples, further includes where the mixer is fixed and immovable, and where the mixer does not rotate and slide. A fifth example of the method, optionally including one or more of the first through fourth examples, further includes where there are no additional inlets or other outlets of the mixer other than the perforations fluidly coupling the mixer to the exhaust passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

Note that FIGS. 5 and 8 show arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A mixer, comprising:
an outer annular portion exterior to an exhaust pipe and an inner annular portion interior to the exhaust pipe, where the outer annular portion comprises a spiral fin extending around the exhaust pipe in a downstream direction with respect to exhaust flow, wherein the inner annular portion is curved and comprises a C-shaped cross-section in the downstream direction, and where the inner annular portion comprises a venturi passage located along its central axis.

2. The mixer of claim 1, wherein the spiral fin comprises a first end arranged along a first axis and a second end arranged along a second axis, and where the first axis is spaced away from and located upstream of the second axis relative to a direction of exhaust gas flow from an engine.

3. The mixer of claim 2, wherein the outer annular portion is fluidly coupled to an exhaust passage of the exhaust pipe upstream of the first axis, and where the outer annular portion is fluidly coupled to the interior annular portion downstream of the second axis.

4. The mixer of claim 1, wherein the outer annular portion and the inner annular portion are hollow and symmetric about a central axis of the exhaust pipe.

5. The mixer of claim 1, wherein the inner annular portion is fluidly coupled to an exhaust passage at each of a venturi inlet, a venturi throat, and a venturi outlet of the venturi passage.

6. The mixer of claim 1, wherein the outer annular portion and the inner annular portion are fluidly coupled via one or more perforations.

7. A mixer, comprising:
an outer annular portion exterior to an exhaust pipe and an inner annular portion interior to the exhaust pipe, where the outer annular portion comprises a spiral fin extending around the exhaust pipe in a downstream direction with respect to exhaust flow, wherein the outer annular portion comprises an outer surface angled relative to the exhaust pipe, and where an injector is coupled to the outer surface and positioned to inject into a flow space between the outer annular portion and the exhaust pipe.

8. A system comprising:
an annular mixing passage located outside of an exhaust pipe, wherein the mixing passage is divided into inner and outer passages, the inner passage is fluidly coupled to an exhaust passage at a location upstream of one or more first blades, and the outer passage is fluidly coupled to the exhaust passage at a location downstream of the one or more first blades and upstream of one or more second blades, wherein the inner passage is located between an inner annular surface and the exhaust pipe, and where the inner annular surface is cantilevered to the exhaust pipe.

9. The system of claim 8, wherein the first blades are twisted in a counterclockwise direction and the second blades are twisted in a clockwise direction.

10. The system of claim 8, wherein the first and second blades comprise free ends proximal to a central axis of the exhaust passage.

11. The system of claim 8, wherein the outer passage is located between an outer annular surface and the inner annular surface, and where the outer annular surface and the inner annular surface extend entirely around a circumference of the exhaust pipe.

12. The system of claim 8, wherein the first and second blades are fixedly coupled to the exhaust pipe and extend in upstream and downstream directions, respectively.

13. A method comprising:
flowing exhaust gas from an exhaust passage to an outer passage of a mixer located exterior to the exhaust passage, where the outer passage surrounds an exhaust pipe of the exhaust passage, wherein the outer passage receives and expels exhaust gas at one or more perforations upstream and downstream of one or more curved fins, a reductant injector positioned to inject into a location between surfaces of the mixer and one or more of the curved fins.

14. The method of claim 13, wherein flowing exhaust gas further includes flowing exhaust gas through a constriction of the exhaust passage formed by an inner portion of the exhaust passage, wherein the inner portion of the exhaust passage is fluidly coupled to a downstream portion of the outer passage.

15. The method of claim 13, wherein the mixer is fixed and immovable, and where the mixer does not rotate and slide.

16. The method of claim 13, wherein there are no additional inlets or other outlets of the mixer other than the one or more perforations fluidly coupling the mixer to the exhaust passage.

17. A method comprising:
flowing exhaust gas from an exhaust passage to an outer passage of a mixer located exterior to the exhaust passage, and where the outer passage surrounds an exhaust pipe of the exhaust passage, wherein the outer passage receives and expels exhaust gas at one or more perforations upstream and downstream of one or more curved fins, and wherein exhaust gas flows in a U-shape through the outer passage.

* * * * *